United States Patent
Rass

(10) Patent No.: US 8,605,924 B2
(45) Date of Patent: Dec. 10, 2013

(54) HEARING APPARATUS INCLUDING TRANSPONDER DETECTION AND CORRESPONDING CONTROL METHOD

(75) Inventor: Uwe Rass, Nürnberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1481 days.

(21) Appl. No.: 12/001,443

(22) Filed: Dec. 11, 2007

(65) Prior Publication Data

US 2008/0182517 A1    Jul. 31, 2008

Related U.S. Application Data

(60) Provisional application No. 60/874,288, filed on Dec. 11, 2006.

(51) Int. Cl.
*H04R 25/00* (2006.01)

(52) U.S. Cl.
USPC .................................. 381/315; 381/312

(58) Field of Classification Search
USPC .................. 381/57, 312, 315, 328, 330
See application file for complete search history.

(56) References Cited

U.S. PATENT DOCUMENTS

| | | | |
|---|---|---|---|
| 6,870,940 | B2 | 3/2005 | Meyer et al. |
| 7,783,067 | B1 * | 8/2010 | Frerking et al. ............... 381/315 |
| 2002/0044669 | A1 | 4/2002 | Meyer et al. |
| 2006/0133633 | A1 * | 6/2006 | Hyvonen et al. ............... 381/315 |
| 2006/0188116 | A1 | 8/2006 | Frerking et al. |
| 2007/0229273 | A1 * | 10/2007 | Hoemann et al. .......... 340/572.4 |

FOREIGN PATENT DOCUMENTS

| | | |
|---|---|---|
| DE | 10048341 C1 | 4/2002 |
| DE | 20 2006 006 921 U1 | 9/2006 |
| EP | 1303166 A2 | 4/2003 |
| EP | 1 389 035 A2 | 2/2004 |
| EP | 1389035 A2 | 2/2004 |
| JP | 2000227947 A | 8/2000 |
| JP | 2007053507 A | 3/2007 |
| WO | 2004107789 A1 | 12/2004 |

OTHER PUBLICATIONS

Christoph Poerschmann, Juergen Carstens, "Automatische Einstellung der Parameter eines mobilen Endgeraets fuer Traeger von Hoergeraeten mit Hilfe von RFID"; IP.Com Journal, IP.Com Inc., West Henrietta, NY, US, Oct. 25, 2004, XP013021588, ISSN: 1533-0001.

Communication from European Search Report, received Nov. 8, 2011, pp. 1-4.

Office action from Japanese Patent office with English translation, Apr. 26, 2011, pp. 1-7.

* cited by examiner

*Primary Examiner* — Brian Ensey

(57) ABSTRACT

The object of the invention is to enable a hearing apparatus and more particularly a hearing device to be controlled automatically in a more reliable manner by means of an external device. For that purpose there is provided in the hearing apparatus a transponder detection unit for detecting a transponder and providing a corresponding detection signal. Signal processing in the hearing apparatus is performed as a function of the detection signal. An external device, e.g. a telephone is physically joined to the transponder. This enables the hearing apparatus to detect the presence of the external device and control its own signal processing accordingly.

14 Claims, 1 Drawing Sheet

HEARING APPARATUS INCLUDING TRANSPONDER DETECTION AND CORRESPONDING CONTROL METHOD

CROSS REFERENCE TO RELATED APPLICATIONS

The present application claims the benefit of the provisional patent application filed on Dec. 11, 2006, and assigned application No. 60/874,288, and is incorporated by reference herein in its entirety.

FIELD OF THE INVENTION

The present invention relates to a hearing apparatus having a signal processing unit for processing an input signal into an output signal that is to be reproduced acoustically. The present invention further relates to a method for controlling a hearing apparatus. The term "hearing apparatus" is understood in this context to mean in particular a hearing device, but also includes a headset, earphones, etc.

BACKGROUND OF THE INVENTION

Hearing devices are portable hearing apparatuses which are used to provide hearing assistance to the hearing-impaired. In order to accommodate the multiplicity of individual requirements, different designs of hearing devices are provided, including behind-the-ear hearing devices (BTE), in-the-ear hearing devices (ITE) and full-shell/half-shell (concha) hearing devices. The hearing devices cited by way of example are worn on the outer ear or in the auditory canal. In addition to these, however, bone conduction hearing aids as well as implantable or vibrotactile hearing aids are also available on the market. The damaged bearing is herewith stimulated either mechanically or electrically.

Essential components of the hearing devices include in principle an input transducer, an amplifier and an output transducer. The input transducer is typically a receiving transducer, e.g. a microphone and/or an electromagnetic receiver, e.g. an induction coil. The output transducer is mostly realized as an electroacoustic converter, e.g. a miniature loudspeaker, or as an electromechanical converter, e.g. a bone conduction receiver. The amplifier is usually integrated into a signal processing unit. This basic configuration is shown in FIG. 1 by way of the example of a behind-the-ear hearing device. One or more microphones 2 for recording the ambient sound are incorporated in a hearing device housing 1 that is designed to be worn behind the ear. A signal processing unit 3, which is likewise integrated into the hearing device housing 1, processes the microphone signals and amplifies them. The output signal of the signal processing unit 3 is transmitted to a loudspeaker and/or receiver 4, which outputs an acoustic signal. In certain cases the sound is transmitted to the ear drum of the hearing device wearer via a sound tube which is secured in the auditory canal by means of an otoplastic. The hearing device and in particular the signal processing unit 3 are supplied with power by means of a battery 5 which is likewise integrated into the hearing device housing 1.

When wearing hearing devices and other hearing apparatuses, the individual user can find himself or herself in different hearing situations. For example, he or she can find himself or herself in the hearing situation "quiet environment", "environment with background noise", "concert hall", "telephoning" etc. The detection of the hearing situation "telephoning" is particularly desirable, since it occurs relatively frequently and in this case the hearing device should be adjusted fundamentally differently compared to standard hearing situations. When a telephone call is made, namely, an inductive input signal can generally be used and acoustically incoming ambient noises can be greatly attenuated. For the user it is particularly advantageous if the hearing situation "telephoning" is detected automatically by the hearing device or the respective hearing apparatus so that a telephone call can be conducted satisfactorily from the outset.

For automatic detection of the hearing situation "telephoning", a widespread practice at the present time is to attach a magnet to the telephone, said magnet actuating a reed contact in the hearing device when the telephone is brought close to the hearing device. The positioning of the magnet in relation to the reed contact is critical. Moreover, the proximity of the strong magnetic field is detrimental to the hearing device receiver, the reason being that a strong magnetic field can not only lead to temporary interference, but also result in the destruction of the receiver or loudspeaker. Furthermore, the reed contact can also easily be triggered by other magnets not attached to the telephone and consequently cause an incorrect control action or program selection.

A wirelessly programmable hearing aid device is known from the publication EP 1 389 035 A2. Said device has a transponder by means of which it can receive programming signals from a programming device and send back specific response signals. For this purpose the transponder has an electric coil.

SUMMARY OF THE INVENTION

The object of the present invention is therefore to enable automatic control of a hearing apparatus from an external point to be performed more reliably.

This object is achieved according to the invention by means of a hearing apparatus having a signal processing unit for processing an input signal into an output signal that is to be reproduced acoustically, and a transponder detection unit for detecting a transponder and providing a corresponding detection signal, wherein the processing is carried out by the signal processing unit as a function of the detection signal.

Accordingly also provided is a bearing system comprising a hearing apparatus of said kind and an external device with respect to the hearing apparatus, said external device being physically joined to a transponder.

Also provided according to the invention is a method for controlling a hearing apparatus by processing an input signal into an output signal that is to be reproduced acoustically, and detecting a transponder as well as providing a corresponding detection signal, wherein the processing is controlled as a function of the detection signal.

The hearing apparatus and more particularly the hearing device can therefore be controlled in a reliable manner by means of a transponder (tag) which is brought within range of the hearing apparatus.

On the hearing apparatus side this requires no additional mechanical or electrical components if the hearing apparatus already possesses an electromagnetic transmission system. In particular, therefore, it is possible to dispense with reed contacts, GMR sensors etc. for detecting the telephone situation. This means that the hearing apparatuses or hearing devices can be built smaller. Moreover, the reliability of the detection is increased according to the invention, since the magnetic field coupling via an extended coil in the transponder is superior to that via a reed contact and a permanent magnet. Furthermore, the transponder is totally inactive magnetically, i.e. it cannot interfere with either the receiver or other sensitive components. This makes transporting it in sensitive environments (e.g. in an aircraft) much less problematical.

The transponder detection unit of the hearing apparatus is able to detect a transponder on the basis of an energy loss. Thus, for example, the oscillation amplitude of a resonance circuit can be checked with very little additional investment of effort. In this case it is favorable if the transponder detection unit cyclically analyzes its own transmission energy for detecting the transponder.

The transponder detection unit may also be able to detect a transponder on the basis of a change in frequency. Accordingly, for example, a defined detuning of the frequency of a resonant circuit can be an unequivocal sign of the presence of a transponder.

Furthermore, the transponder detection unit may be able to detect a transponder on the basis of a pulse response. In this case use can advantageously be made of the fact that a transponder can respond to a transmission pulse in a characteristic manner.

According to a further preferred embodiment, the transponder detection unit uses a plurality of frequencies for the purpose of detection. In this case it can be provided, for example, that a predefined frequency range will be scanned by the transponder detection unit. Toward that end, the frequencies can be varied for example by sweeping or by switching, both of which are very easy to implement.

On the transponder side it is particularly favorable if the transponder consists solely of an LC resonant circuit. A transponder of this kind can be manufactured conveniently and in a very small design.

BRIEF DESCRIPTION OF THE DRAWINGS

The present invention is explained in more detail with reference to the attached drawings, in which.

DETAILED DESCRIPTION OF THE INVENTION

The exemplary embodiments described in greater detail below represent preferred embodiments of the present invention.

Figure 1:
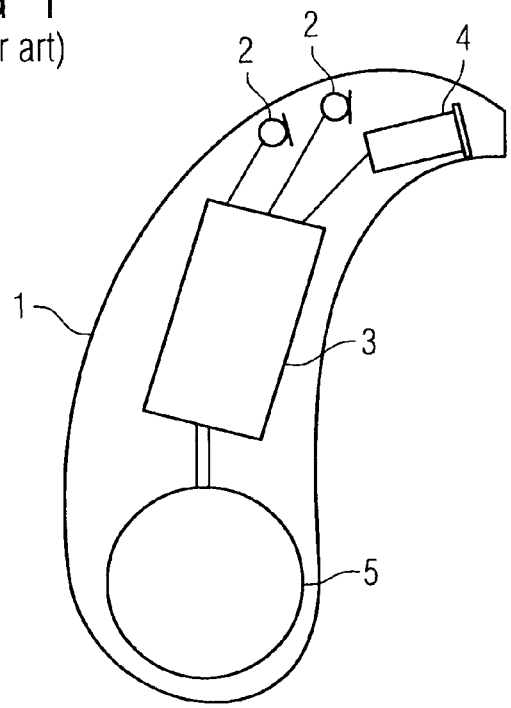
FIG. 1 shows the basic structure of a hearing device according to the prior art.
Figure 2:
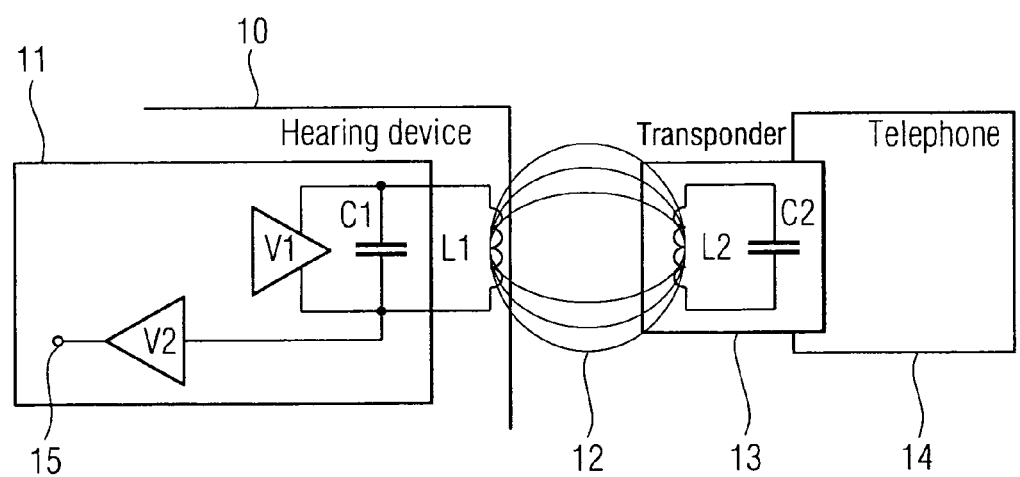
FIG. 2 shows a schematic diagram illustrating the detection of a transponder by means of a hearing device.

According to the example shown in FIG. 2, a hearing device 10 has what is termed a wireless system 11 by means of which it is able to set up a wireless connection to an external device. In the present case, an LC resonant circuit comprising a capacitor C1 and a coil L1 is used for the electromagnetic transmission by the wireless system 11. The resonant circuit is controlled or driven by means of a driver V1. An alternating magnetic field 12 is generated by means of the coil L1 of the hearing device 10.

The hearing device is now expected to detect that a telephone or another device has been brought within its range in order to switch into the corresponding hearing device program, in this case a telephone program. A remote control of a television set or a radio, for example, can also be brought close to the hearing device in order to effect a corresponding switch into a television hearing device program or radio hearing device program. The hearing device 10 itself can, of course, also be brought into the vicinity of the respective external device.

To ensure that the hearing device 10 detects the external device (telephone, remote control, etc.), a transponder is attached to said external device. In the example shown in FIG. 2, the transponder 13 is fixed to a telephone 14.

A coil L2 in combination with a capacitor C2 forms a resonant circuit of the transponder 13. The two components L2, C2 form a simple RFID transponder. An RFID transponder is also known for example from the publication DE 20 2006 006 921 U1.

The coil L2 of the transponder 13 acts as an antenna and interacts with the magnetic field 12. The energy requirement of the wireless system 11 of the hearing device is therefore affected during operation by the presence of the transponder 13 or, as the case may be, of its resonant circuit L2, C2. This principle is known from RFID technology.

Since the resonant circuit transponder 13 is attached to the telephone receiver or the telephone 14 or the corresponding other external device, the coil L2 and the capacitor C2 should be implemented in a very low-profile design. In such an arrangement the surface area encompassed by the coil L2 is essentially freely selectable. The surface area is nonetheless important for the detection rate, since the field density of the receiving coil L2 determines the induced voltage.

The approaching of the transponder 13 is determined by cyclical polling of the transmission energy in the hearing device 10. According to the example of FIG. 2, a voltage is tapped off for this purpose at the transmitting resonant circuit L1, C1, amplified by means of an amplifier V2 and made available to the hearing device signal processing function as a detection signal 15. In contrast to the solution using a magnet attached to the telephone receiver, in this case the hearing device 10 actively searches for the transponder 13.

The frequencies at which the hearing device 10 searches for the transponder 13 are varied over a small range in order to compensate for manufacturing tolerances of the transponder 13. At the same time the frequencies can be varied continuously by sweeping or intermittently by switching.

The reliability of telephone detection can be increased in the case of binaural hearing assistance to a hearing device wearer if the two hearing devices are coupled to each other wirelessly or in a wired manner. In this case the telephone detection function preferably operates only if the transmission energy at the resonance frequency is increased on one side and not on the other side.

The invention claimed is:

1. A hearing apparatus, comprising:
    a binaural hearing apparatus that comprises two coupled hearing devices, wherein each hearing device comprises:
        a transponder detection unit that wirelessly detects within a predetermined frequency range an electromagnetic transmission response from a transponder of an external device that is brought within an alternating magnetic field by analyzing a transmission energy, wherein the transponder detection unit generates a corresponding detection signal upon detecting the external device is present in the predetermined frequency range; and
        a signal processing unit that receives the detection signal and operates a detection function that automatically switches a programming mode of the hearing apparatus based on the detection signal in order to process an input signal of the hearing apparatus into an output signal in accordance with the programming mode that corresponds to a program for a situation represented by the presence of the external device, wherein the detection function operates only if the transmission energy is increased for one of the hearing devices and is not increased for the other hearing device.

2. The hearing apparatus as claimed in claim 1, wherein the transponder detection unit detects the transponder based on an energy loss by cyclically analyzing the transmission energy of the transponder detection unit in accordance with an oscillation amplitude of a resonance circuit of the transponder detection unit indicating the transponder is present.

3. The hearing apparatus as claimed in claim 1, wherein the transponder comprises an LC circuit of an RFID-technology based transponder attached to a telephone apparatus as the external device, and wherein the programming mode comprises a telephone program.

4. The hearing apparatus as claimed in claim 1, wherein the transponder detection unit detects the transponder based on a change in frequency by searching for and detecting a predefined detuning of a frequency of a resonant circuit indicating the transponder is present.

5. The hearing apparatus as claimed in claim 1, wherein the transponder detection unit detects the transponder based on a pulse response wherein the transponder responds to a transmission pulse in a characteristic manner indicating the transponder is present.

6. The hearing apparatus as claimed in claim 1, wherein the transponder is detected based on a plurality of frequencies by scanning the predetermined frequency range, wherein the plurality of frequencies are varied by sweeping or switching indicating the transponder is present.

7. The hearing apparatus as claimed in claim 1, wherein the transponder is attached to a telephone as the external device, wherein the telephone is detected based on the transmission energy detected at a predefined resonance frequency that is increased for one of the hearing devices and is not increased for the other hearing device, and wherein the programming mode comprises a telephone program.

8. A hearing system, comprising:
an external device comprising a transponder attached thereto;
a binaural hearing apparatus for processing an input signal into an output signal that comprises two coupled hearing devices, wherein each hearing device comprises;
a transponder detection unit that wirelessly detects within a predetermined frequency range an electromagnetic transmission response from the transponder of the external device that is brought within an alternating magnetic field by analyzing a transmission energy, wherein the transponder detection unit generates a corresponding detection signal upon detecting the external device is present in the predetermined frequency range;
a signal processing unit arranged on the hearing apparatus that receives the detection signal and operates a detection function that automatically switches a programming mode of the hearing apparatus based on the detection signal in order to process the input signal of the hearing apparatus into the output signal in accordance with the programming mode that corresponds to a program for a situation represented by the presence of the external device, wherein the detection function operates only if the transmission energy is increased for one of the hearing devices and is not increased for the other hearing device.

9. The hearing system as claimed in claim 8, wherein the transponder comprises an LC resonant circuit and is attached to a telephone as the external device, wherein the telephone is detected based on the transmission energy detected at a predefined resonance frequency that is increased for one of the hearing devices and is not increased for the other hearing device, and wherein the programming mode comprises a telephone program.

10. A method for controlling a binaural hearing apparatus that comprises two coupled hearing devices, comprising:
detecting via a transponder detection unit within a predetermined frequency range an electromagnetic transmission response from a transponder of an external device that is brought within an alternating magnetic field generated by one of the hearing devices by analyzing a transmission energy;
generating via the transponder detection unit a corresponding detection signal upon detecting the external device is present in the predetermined frequency range;
receiving by a signal processing unit the detection signal and operating a detection function that switches a programming mode of the hearing apparatus based on the detection signal, wherein the detection function operates only if the transmission energy is increased for one of the hearing devices and is not increased for the other hearing device; and
processing an input signal of the hearing apparatus into an output signal in accordance with the programming mode that corresponds to a program for a situation represented by the presence of the external device.

11. The method as claimed in claim 10, wherein the transponder is detected based on an energy loss by cyclically analyzing the transmission energy of the transponder detection unit in accordance with an oscillation amplitude of a resonance circuit of the transponder detection unit indicating the transponder is present.

12. The method as claimed in claim 10, wherein the transponder is detected based on a change in frequency by searching for and detecting a predefined detuning of a frequency of a resonant circuit indicating the transponder is present.

13. The method as claimed in claim 10, wherein the transponder is detected based on a pulse response wherein the transponder responds to a transmission pulse in a characteristic manner indicating the transponder is present.

14. The method as claimed in claim 10, wherein the transponder is attached to a telephone as the external device, wherein the telephone is detected based on the transmission energy detected at a predefined resonance frequency that is increased for one of the hearing devices and is not increased for the other hearing device.

* * * * *